(12) United States Patent
Costa et al.

(10) Patent No.: US 9,015,473 B2
(45) Date of Patent: Apr. 21, 2015

(54) METHOD AND SYSTEM FOR AUTOMATED AND SECURE PROVISIONING OF SERVICE ACCESS CREDENTIALS FOR ON-LINE SERVICES TO USERS OF MOBILE COMMUNICATION TERMINALS

(75) Inventors: Luciana Costa, Turin (IT); Paolo De Lutiis, Turin (IT); Federico Frosali, Turin (IT)

(73) Assignee: Telecom Italia S.p.A., Milan (IT)

( * ) Notice: Subject to any disclaimer, the term of this patent is extended or adjusted under 35 U.S.C. 154(b) by 1143 days.

(21) Appl. No.: 12/085,768

(22) PCT Filed: Nov. 30, 2005

(86) PCT No.: PCT/EP2005/012766
§ 371 (c)(1),
(2), (4) Date: Nov. 10, 2008

(87) PCT Pub. No.: WO2007/062672
PCT Pub. Date: Jun. 7, 2007

(65) Prior Publication Data
US 2009/0158032 A1    Jun. 18, 2009

(51) Int. Cl.
*H04L 29/00* (2006.01)
*H04L 29/06* (2006.01)

(52) U.S. Cl.
CPC .......... *H04L 63/0442* (2013.01); *H04L 63/062* (2013.01); *H04L 63/0823* (2013.01); *H04L 63/10* (2013.01)

(58) Field of Classification Search
USPC ................................. 726/6; 380/259, 289, 30
See application file for complete search history.

(56) References Cited

U.S. PATENT DOCUMENTS 6,611,194 B1    8/2003    Vieweg et al.
7,188,360 B2 *  3/2007    Gerdes et al. .................. 726/4

(Continued)

FOREIGN PATENT DOCUMENTS

EP        1 117 204 A2      7/2001
WO        WO 00/62507      10/2000

OTHER PUBLICATIONS

3GPP TS 33.220 V6.5.0, "3rd Generation Partnership Project; Technical Specification Group Services and Systems Aspects; Generic Authentication Architecutre (GAA); Generic bootstrapping architecture (Release 6)", pp. 1-39, Jun. 2005.

(Continued)

*Primary Examiner* — Brandon Hoffman
*Assistant Examiner* — Michael D Anderson
(74) *Attorney, Agent, or Firm* — Finnegan, Hernderson, Farabow, Garrett & Dunner, L.L.P.

(57) ABSTRACT

In a communications network including at least one authentication entity adapted to authenticating a network access requestor in order to conditionally grant thereto access to the communications network, wherein the authenticating is based on public key cryptography, a method for automatically provisioning the network access requestor with service access credentials for accessing an on-line service offered by an on-line service provider accessible through the communications network. The method includes: during the authenticating the network access requestor, having an authentication entity request to the on-line service provider the generation of the service access credentials; at the on-line service provider, generating the service access credentials, encrypting the service access credentials by exploiting a public encryption key of the network access requestor and providing the encrypted service access credentials to the authentication entity; and having the authentication entity cause the network access requestor to be provided with the encrypted service access credentials.

24 Claims, 4 Drawing Sheets

(56) References Cited

U.S. PATENT DOCUMENTS

| | | | |
|---|---|---|---|
| 7,398,550 B2* | 7/2008 | Zick et al. | 726/5 |
| 2002/0007412 A1* | 1/2002 | Paridaens et al. | 709/229 |
| 2004/0240671 A1 | 12/2004 | Hu et al. | |

OTHER PUBLICATIONS

3GPP TS 33.221 V6.2.0, "3$^{rd}$ Generation Partnership Project; Technical Specification Group Services and System Aspects; Generic Authentication Architecture (GAA); Support for Subscriber certificates (Release 6)", pp. 1-25, Dec. 2004.

3GPP TS 33.222 V6.4.0, "3$^{rd}$ Generation Partnership Project; Technical Specification Group Services and System Aspects; Generic Authentication Architecture (GAA); Access to network application functions using Hypertext Transfer Protocol over Transport Layer Security (HTTPS) (Release 6)", pp. 1-20, Jun. 2005.

Funk, et al., draft-funk-eap-ttls-v1-00.txt, "EAP Tunneled TLS Authentication Protocol version 1 (EAP-TTLSv1)", pp. 1-21, Feb. 2005.

Eronen, et al., draft-ietf-aaa-eap-10.txt, "Diameter Extensible Authentication Protocol (EAP) Application", pp. 1-35, Nov. 17, 2004.

Palekar, et al., draft-josefsson-pppext-eap-tls-eap-10.txt, "Protected EAP Protocol (PEAP) Version 2", pp. 1-83, Oct. 15, 2004.

Funk, et al., draft-funk-eap-ttls-v0-00.txt, "EAP Tunneled TLS Authentication Protocol Version 0 (EAP-TTLSv0)", pp. 1-37, Feb. 2005.

Aboba, et al., draft-aboba-pppext-key-problem, "Extensible Authentication Protocol (EAP) Key Management Framework", pp. 1-74, Jul. 17, 2005.

Forsberg, et al., "Protocol for Carrying Authentication for Network Access (PANA) draft-ietf-pana-pana-10", pp. 1-78, Jul. 16, 2005.

Yanagiya, et al., "Service Authentication Architecture Using Extensible Authentication Protocol (EAP) Key <draft-yanagiya-eap-saa-01.txt>", pp. 1-13, Feb. 16, 2004.

Aboba, et al., rfc2716, "PPP EAP TLS Authentication Protocol", pp. 1-22, Oct. 1999.

Aboba, et al., rfc3579, "RADIUS (Remote Authentication Dial in User Service) Support for Extensible Authentication Protocol (EAP)", pp. 1-46, Sep. 2003.

Aboba, et al., rfc3748, "Extensible Authentication Protocol (EAP)", pp. 1-67, Jun. 2004.

* cited by examiner

METHOD AND SYSTEM FOR AUTOMATED AND SECURE PROVISIONING OF SERVICE ACCESS CREDENTIALS FOR ON-LINE SERVICES TO USERS OF MOBILE COMMUNICATION TERMINALS

CROSS REFERENCE TO RELATED APPLICATION

This application is a national phase application based on PCT/EP2005/012766, filed Nov. 30, 2005, the content of which is incorporated herein by reference.

FIELD OF THE INVENTION

The present invention generally relates to the field of telecommunications, particularly to mobile data communication networks and, even more particularly, to wireless data communications networks, like those complying with the standard IEEE (Institute of Electrical and Electronics Engineers) 802.11. More specifically, the invention concerns a method and a related system for the automated and secure provisioning of on-line service access credentials to users of mobile communication terminals.

BACKGROUND OF THE INVENTION

In recent years, Wireless Local Area Networks (Wireless LANs or WLANs) have experienced a wide spread; the reasons for this can be traced back to the advantages in terms of ease of installation and use of wireless connections, the decreasing cost of hardware equipment (both in respect of the mobile user terminals—like portable personal computers, laptops, palmtops, PDAs, smartphones and the like—and network access points), the good performances in terms of maximum bit-rate, comparable to that of wired data communications networks, and, differently from mobile telephony networks, the use of unlicensed radio bands.

Most WLAN deployments comply with the IEEE 802.11 standard, commonly called "Wi-Fi", a short term for "Wireless Fidelity". The IEEE 802.11 standard, available on the Internet for download at the URL: http://standards.ieee.org/getieee802/802.11.html (at the filing date of the present patent application), specifies the Medium Access Control (MAC) and physical (PHY) layers for devices capable of operation in the unlicensed Industrial, Scientific, and Medical (ISM) radio bands (2.4 GHz and 5 GHz).

Wireless communication technologies are mostly used to access packet-switched data networks, either public (like the Internet) or private (Value Added Service—VAS—networks). In this way, mobile users are allowed to access an enormous number of on-line services and applications made available by service providers. For example, data services and applications like e-mail, e-commerce, e-banking etc. are already, or are becoming accessible via mobile devices like PDAs, laptops, smartphones.

Complex security issues are however to be faced and solved, not to become an obstacle to the further spreading and success of wireless technology.

WLANs are as a matter of fact inherently less secure than conventional wired LANs, for the reason that they use radio as communication medium. In a wireless network it is hard to control the exact extension range of the network: transmitted data are broadcast over the air using radio waves. Because radio waves travel through the ceiling, floors and walls, the transmitted data may reach unintended recipients. Without setting up stringent security measures, installing a WLAN can be the equivalent of putting Ethernet ports everywhere. For example, in the case of a company's private WLAN, the radio signal can easily get over the boundary of the company site and an attacker, with a suitable antenna, can passively monitor ("sniff", in jargon) network traffic without the need to access neither physically nor logically the network.

As with other networks, security for WLANs focuses on access control and privacy. Traditional implementation of WLAN security includes the use of static Wired Equivalent Privacy (WEP) keys and optional Media Access Control (MAC) authentication. This combination offers a certain level of access control and privacy, but it has been recognized that vulnerabilities exist in the IEEE 802.11 authentication and data privacy schemes. In particular, the WEP suffers from a serious flaw which makes it possible for an attacker to discover the WEP key by just sniffing a certain amount of Wi-Fi data traffic. Moreover, the WEP key provisioning is not dynamic, that is the key is manually configured on each user terminal intended to access the wireless network, and is stored in clear and only in a few case in the firmware of a smart card. These WEP weaknesses, together with the absence of authentication of management and control messages, contribute to make Wi-Fi networks deeply insecure.

To increase the wireless network security, the IEEE 802.11 standardization group has defined an amendment to the original IEEE 802.11 standard, called IEEE 802.11i and commercially known as Wi-Fi Protected Access (WPA), which establishes a new security standard for Wi-Fi networks. As known in the art, the IEEE 802.11i standard relies on a port-based network access-control mechanism established in another, independent standard, called IEEE 802.1X (IEEE standard for local and metropolitan area networks-port-based network exchange), for authentication and key distribution. This standard, applied to WLANs, is adapted to enable strong, mutual authentication between a client (a so-called "supplicant") and an authentication server. In addition, the IEEE 802.1X can provide dynamic per-user, per-session keys that can be used to protect the data link layer, removing the administrative burden and security issues inherent in the use of static WEP keys.

The IEEE 802.1X authentication procedure is performed before the generic mobile terminal gets access to the wireless network. The network operator verifies the mobile terminal identity and, based on this check, the mobile terminal is granted the access to the network.

Once the mobile terminal has accessed the WLAN, the user thereof may for example surf on the Internet and get to the Web sites of on-line service providers providing on-line services. In order to enjoy the on-line services, the authentication performed with the wireless network operator for being granted access to the wireless network is generally not sufficient: in addition thereto, the user of the mobile terminal needs to authenticate to the service providers of which he/she intends to enjoy the on-line services; in other words, service providers ask the users to authenticate before they are granted access to the services they offer, no matter if they have already authenticated with the wireless network operator. Typically, the authentication mechanism and the credentials (hereinafter referred to as service access credentials) needed for authenticating to an on-line service provider are different and independent from those used for authenticating to the network operator.

From one hand, the independency of the authentication mechanism, particularly of the network access credentials used by the mobile terminal of the user for the network access from the service access credentials used for authenticating to the on-line application service provider satisfies a security requirement: should it not be like this, if an attacker compromises a mobile communication terminal, getting possession of the credentials used to perform the network access, it would be able to launch an attack against the on-line service provider as well, for example compromising the user electronic mail archive. Additionally, the use of service access credentials that are different from those of the access network is necessary for a flexible credential provisioning mechanism.

On the other hand, this may pose problems to the network operators and the on-line service providers, that have to provide credentials to their customers in a secure and efficient way; also, and this is everyday experience, the users should manage a growing number of different access credentials (usernames, passwords), with all the risks that this involve (lost or stolen passwords, impersonation, etc.).

Some solutions for provisioning of service access credentials are known in the art.

For example, in the 3GPP GBA (Generic Bootstrapping Architecture), defined in the 3GPP Technical Specifications (TSs) 33.220, 33.221, 33.222 downloadable (at the date of filing of the present patent application) from the URL www.3gpp.org, a framework is defined for application keys generation based on the 3G UMTS mobile network authentication protocol. GBA is based on a mobile terminal with an UICC (SIM) storing a secret key K, a NAF (Network Application Function) application server, i.e. a Web server or a generic data service server (the NAF and the mobile terminal do not share any secret to authenticate the terminal to the server), and a BSF (Bootstrapping Server Function) server located in the mobile operator network which knows the secret key K stored in mobile terminal UICC and that can authenticate the mobile terminal through an authentication mechanism based on the knowledge of the secret key K. Following the mobile terminal authentication, the BSF server communicates to the NAF server a secret key shared by the terminal which the mobile terminal can use to access NAF server.

The IETF (Internet Engineering Task Force) Extensible Application Protocol (EAP) key management (a draft of which is downloadable, at the filing date of the present patent application, from the URL http://tools.ietf.org/wg/eap/draft-ietf-eap-keying/draft-ietf-eap-keying-07.txt) provides a framework for generation, transport and usage of keying material generated by EAP authentication algorithms, known as "methods". As described in the draft, an Extended Master Session Key (EMSK) is derived as part of the EAP authentication process, which EMSK is known only to the authentication server and the supplicant of the IEEE 802.1X framework. In the draft "EAP key management extensions" (downloadable at the filing date of the present application from the URL http://www.drizzle.con-d-aboba/EAP/draft-aboba-eapkeying-extns-OO.txt), extensions to the EAP key management framework are defined to enable the use of EAP in new applications. In that draft, Application-specific Master Session Keys (AMSKs) are defined as keys derived from the EMSK, which are shared by the supplicant and the authentication server.

U.S. Pat. No. 6,611,194 describes a method for inserting a service key in a terminal, and devices for implementing said method. A service key is inserted into a terminal and is used to enable the decryption of the received encrypted service data from a service center. The service center requests and obtains a coding key from a trust center when the service center receives a service key transmission request from the terminal. The service key transmission request includes a terminal identity number. The service center forwards the request to the trust center which returns the coding key associated with a decoding key corresponding to the specific terminal. The service center encrypts the service key with the coding key and transmits the service key to the terminal. The service key is decrypted in the terminal using the decoding key input to the terminal by the terminal manufacturer. The service data can correspondingly be decrypted for use by the terminal user. The terminal manufacturer transmits to the trust center a terminal identity number which enable the trust center to assign a decoding key to a terminal. The decoding key provided in the terminal by the terminal manufacturer is transmitted to the terminal manufacturer by a trust center. Dedicates service keys can be provided for each of the different services from a service center.

US 2004/0240671 discloses a method for remote loading of an encryption key in a telecommunication network station, which makes it possible to load in a SIM, for a wireless terminal, encryption keys of one or more applications remotely, in a secure manner. The loading of the keys is achieved by means of messages transmitted to the wireless terminal via SMS. To provide security of the transmission the message is encrypted by means of a so called "transportation" or "transmission key" which is created and recorded in the SIM card at the time of the personalization thereof by an operator. The key loading or change is initiated either by the user or by the service provider of the application, for example a bank for banking transactions. The loading step is preceded by a step consisting of detecting in the SIM the absence of a key or a requirement to update the said key. Where the loading of the transaction key is initiated by the application key server it detects the fact that in a transaction message coming from the wireless terminal the transaction key does not exist or is not longer appropriate for performing the transaction. The message which is analyzed is a cryptographic certificate or a request from the SIM. The analysis is performed by the application key server or by the server connected to the application key server such as a server of the associated application or a server of the service provider of the associated application. The invention of US 2004/0240671 proposes a solution to an additional technical problem which stems from the fact that the same application may be shared by different service providers, each requiring different transaction keys for using the application. The invention makes it possible to select the key corresponding to the service provider to which the transaction to be performed relates: it thus makes it possible, for one and the same application, to choose from amongst several possible keys those which correspond to a certain service provider at a given moment. The short message comprises an identity of a service provider corresponding to the transaction application in order to select the correct key to which the transaction relates.

SUMMARY OF THE INVENTION

The Applicant has observed that, up to now, the solutions proposed in the art for the provisioning of application keys to be used for the authentication of the users of mobile terminals to online service providers are not completely satisfactory.

For example, in respect of the 3GPP GBA, the application secret key is known to the wireless network operator, and this is highly insecure (and generally unacceptable by the on-line service providers), because the network operator may operate MITM attacks against the online service provider. In fact, it is the bootstrapping server function resident in the network operator that transmits to the NAF the secret application key.

Concerning the IETF EAP keying framework proposal and EAP key management extensions, the Applicant observes that despite several AAA ("Authentication, Authorization and Accounting") applications making use of AMSKs have been proposed (for example, key request, which could be used to communicate an authentication key to a third part application server), current EAP peer and server implementations do not support generation of AMSKs, nor do existing AAA specifications (such as RFC3579 or DIAMEAP) support the transport of AMSKs. As a result, the use of AMSKs requires extensions to the EAP Key Management framework, as well as the definition of new AAA applications. In addition, similar considerations as those made in connection with the 3GPP GBA hold true: the AMSK is derived as part of the authentication process and is known to the supplicant and to the authentication server of the wireless network access provider. If this key is used to provide access to third part on-line application servers, the network operator can easily perform a MITM attack.

In respect of the method of U.S. Pat. No. 6,611,194, the Applicant observes that in order to request the application key, each client must be connected to a network; hence, the (client-operator) authentication performed to access the network is not related to the authentication (client-service provider) performed to access the application service. The Applicant believes instead that it could be useful for the on-line service provider to know which network the client is connected to, for example to enable some high sensitive functions for client connected through a network known to provide high security, and to disable such functions when the client is connected through low security network. Additionally, the service key is not an OTP (One Time Password), which means that it can be re-used by an attacker who is able to get it. Also, the method is strictly related to the provisioning of security credentials at the manufacturing time (off-line).

Concerning US 2004/0240671, the Applicant observes that the method applies only to a wireless terminal equipped with a SIM card, and uses SMS as communication channel. The secret key used to decrypt the on-line service provider application key is either known to the wireless network operator, and hence it could perform a MITM attack, or it must be provisioned off-line by each service provider.

Further, the Applicant has observed that the problem of having a secure mechanism for provisioning a communications terminal with the service access credentials is not restricted to contexts in which the access network is a wireless communications network, but also regards other mobility scenarios, where the access network is not necessarily a wireless network. For example, a communications terminal (e.g., a laptop or an IP-phone) without wireless capabilities can be moved to different access networks (which may be owned by different network providers, with different network technologies, wireless or wired), achieving some form of limited mobility also known as nomadicity. For example, an employee of an organization could use a laptop at work, connected to the wired network provided by his/her organization, and through that connectivity retrieve his/her application services (i.e. e-government). During free time, that employee could use the same personal computer at home, e.g. connected to his/her own residential ADSL gateway to retrieve the same application services.

In view of the state of the background outlined in the foregoing, the Applicant has tackled the problem of how to generate on-line service access credentials, and to distribute them in a secure way to users of a communications network, in order to enable the users to access and enjoy the desired on-line services using said credentials, thereby simplifying the credentials management by the end user.

In particular, the Applicant has tackled the problem of how to automatically generate and provision, individually, to the mobile communication terminals, service access credentials, e.g. one or more secret keys, to be used by the terminals when accessing one or more on-line service providers, in a way that it does not depend on the mechanism, particularly on the credentials used to gain access to the communication network.

The Applicant has found that this problem can be solved by provisioning to the user of a communications terminal the desired service access credentials for authenticating to an on-line service provider as part of the authentication process that enables the terminal access the network, without requiring the use of different provisioning methods, one for the communications network operator and one for the service provider.

According to a first aspect of the present invention, a method is provided as set forth in appended claim 1, for automatically provisioning a network access requestor with service access credentials for accessing an on-line service offered by an on-line service provider accessible through the communications network, the method comprising:

during the authentication of the network access requestor, having an authentication entity (e.g., an authentication server), responsible of conditionally granting to the network access requestor access to the network, request to the on-line service provider the generation of said service access credentials;

at the on-line service provider, generating the service access credentials, encrypting the service access credentials by exploiting a public encryption key of the network access requestor and providing the encrypted service access credentials to the authentication entity;

having the authentication entity provide to the network access requestor the encrypted service access credentials.

Thanks to the present invention, the end-user has no longer the need to manage different log-ins for different applications with the related security problems previously described, as those credentials are automatically generated on the terminal simplifying end-user experience.

The service access credentials for authenticating to the on-line service provider, derived as part of the authentication process of the user's communications terminal to the network, are not known to the network operator, and this guarantees the on-line service provider from MITM (Man In The Middle) attacks operated by or through the network operator.

In a preferred embodiment of the present invention, the service access credentials are derived not only on a per-user basis, but also on a per-session basis (i.e., they are valid only within that session, and expire when the user wireless terminal disconnects from the communications network); this guarantees the user and the service provider an OTP mechanism far more secure than a "static" solution.

According to a second aspect of the present invention, a system is provided, for automatically provisioning a communications terminal, adapted to the use in a communications network, service access credentials for accessing an online service offered by an on-line service provider accessible through the communications network.

According to a third aspect of the present invention, an authenticator entity is provided, adapted to the use in a communications network for authenticating a network access requestor in order to conditionally grant thereto access to the communications network, and adapted to request to an on-line service provider, accessible through the communications network and providing an on-line service, the generation of said service access credentials for accessing during said authenticating the network access requestor, and to cause the network access requestor to be provided with the encrypted service access credentials as a part of said authenticating.

According to a fourth aspect of the present invention, an on-line service provider is provided, accessible through a communications network and providing an on-line service, adapted to:
  receive a request for service access credentials by an authentication entity adapted to authenticating a network access requestor in order to conditionally grant thereto access to the communications network, based on public key cryptography;
  generate the service access credentials;
  encrypt the service access credentials by exploiting a public encryption key of the network access requestor, and
  provide the encrypted service access credentials to the authentication entity.

According to a fifth aspect of the present invention, a communications terminal is provided, for use in a communications network, adapted to:
  interact with an authentication entity during an authentication procedure for being granted access to the communications network, based on public key cryptography;
  during the authentication procedure with the authentication entity, receive therefrom encrypted service access credentials for accessing an on-line service offered by an on-line service provider accessible through the network, said encrypted service access credentials being encrypted with the public encryption key of the communication
  terminal; and
  decrypt the received encrypted service access credentials using a private decryption key.

BRIEF DESCRIPTION OF THE DRAWINGS

The features and advantages of the present invention will be made apparent by the following detailed description of some embodiments thereof, provided merely by way of non-limitative examples, description that will be conducted making reference to the annexed drawings, wherein.

DETAILED DESCRIPTION OF THE PREFERRED EMBODIMENT(S) OF THE INVENTION

Figure 1:
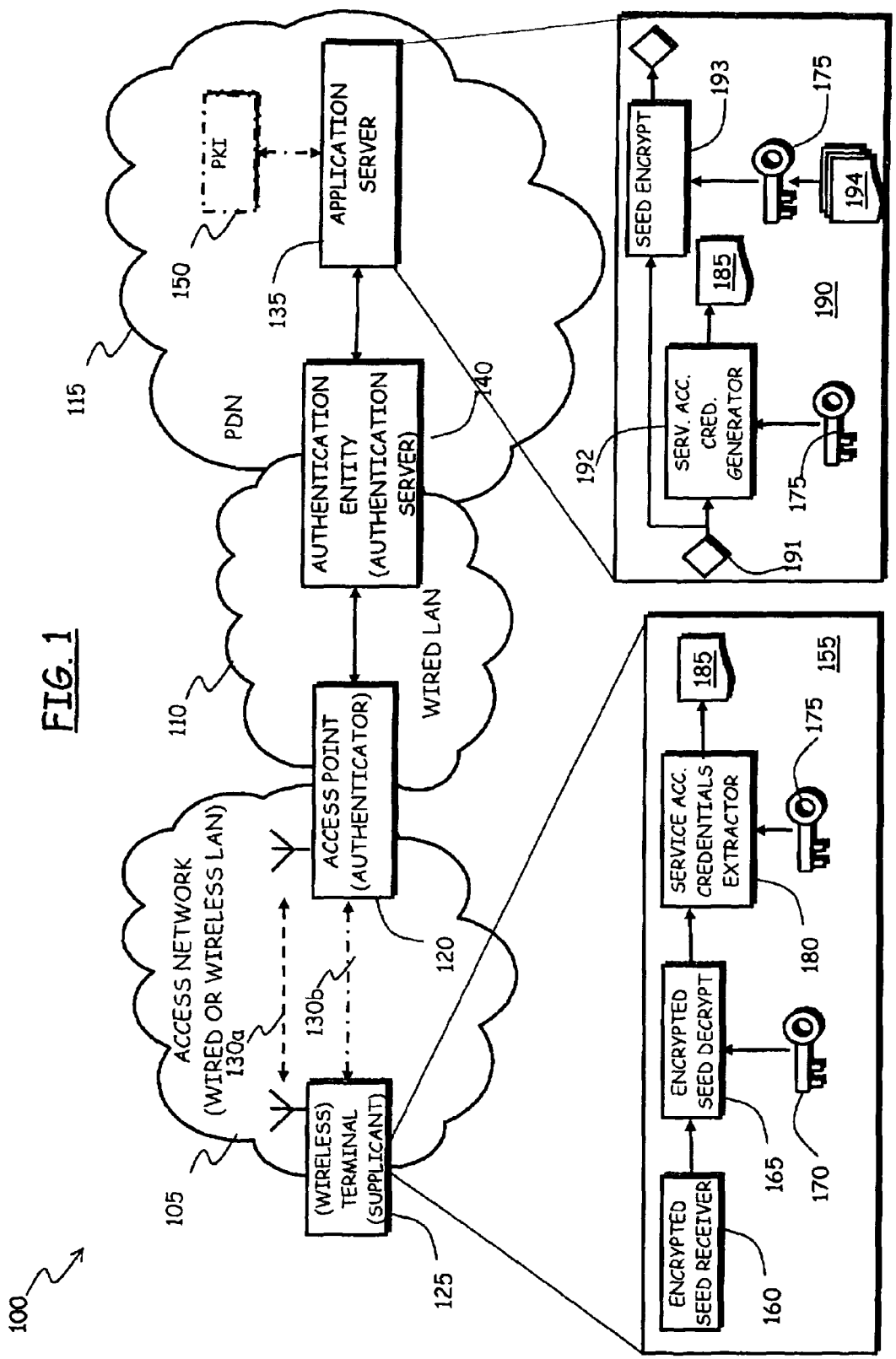
FIG. 1 schematically shows a scenario in which a service access credentials provisioning method according to the present invention is advantageously used.

Making reference to the drawings, in FIG. 1 a portion of a data communications network is schematically shown in which an automatic service access credentials provisioning method according to the present invention is advantageously used.

In particular, the data communications network, globally identified by 100, comprises an access network 105, which can be either a wired network, for example a LAN complying with the standard IEEE 802.3, or a wireless network, particularly a WLAN or Wi-Fi LAN (i.e., a wireless network complying with the standard IEEE 802.11), attached to an infra-structured, wired LAN 110, which in turn is connected to a Packet Data Network (PDN) 115, for example a MAN (Metropolitan Area Network) or a WAN (Wide Area Network), or a still wider network, either public, like the Internet, or private, like an intranet.

In the following, reference will be made by way of example to the case that the access network 105 is a wireless network. The wireless network 105 comprises a plurality of Access Points (APs), like the AP labeled 120 in the drawing. Through the APs 120, users of wireless mobile communications terminals, also referred to as wireless terminals, like the wireless terminal 125 in the drawing, can connect, exploiting a radio data communication link 130a, to the wireless network 105. It is pointed out that, in case the access network 105 is a wired network, the communications terminal 125 needs not have wireless communications capabilities, and the connection to the access network 105 takes place through a wired link 130b, e.g. via an Ethernet (IEEE 802.3) link connection.

The wireless network 105 is attached and provides access to the wired LAN 110, so that the wireless terminals connected to the wireless network 105 can access the wired LAN 110. In particular, the wireless network 105 is associated to the wired LAN 110 through the APs 120.

Through the wireless network 105, the wireless terminals can access the PDN 115, for example they can surf over the Internet, browse Web sites, or connect to a company's intranet. In particular, the wireless terminals may access on-line services provided by one or more on-line service providers, like the application server 135 shown in the drawing; for example, the application server 135 may provide on-line banking services, e-commerce services, electronic mail services, Voice Over IP (VoIP) services and the like. In particular, it is assumed that in order for the user of the wireless terminal 125 to access the application server 135 for enjoying the on-line services offered, the user needs to preliminary authenticate at the application server 135.

Also shown in the drawing is a network device 140 called the Authentication Server (AS), which plays the role of authentication entity intended to provide authentication services to the APs like the AP 120 for authenticating the wireless terminals (the network access requestors) before granting thereto access to the wired LAN 110.

In particular, in a preferred embodiment of the present invention, it is assumed that the wireless network 105 implements the WPA specification according to the IEEE 802.11i standard. In particular, a port-based network access control based on the IEEE 802.1X standard is implemented.

As known in the art, the IEEE 802.11i standard has the following main characteristics:
  it uses the IEEE 802.1X for authentication and key distribution;
  it uses a keyed Message Authentication Code (MAC), also known as Michael, for packet-level integrity protection;
  it uses a Temporal Key Integrity Protocol (TKIP) for data encryption; as known, the TKIP is intended for interim deployment and retrofit of existing WEP devices, and is motivated by a need to overcome the key derivation and packet integrity weaknesses of WEP; it retains the WEP frame formats and use of the RC4 algorithm;
  it uses the CCMP—Advanced Encryption Standard (AES) for data encryption (TKIP is only an intermediate solution; the IEEE 802.11i task group has considered the use of the AES algorithm, for both data confidentiality and integrity, as a replacement of the RC4 algorithm);

it may also use a Pre-Shared Key (PSK) for authentication without the use of an authentication server (a feature especially suited for domestic environments).

Even if the IEEE 802.1X is an independent standard, it is the core element of the IEEE 802.11i standard, providing a port-based network access control mechanism. The IEEE 802.1X standard relies on the Extensible Authentication Protocol (RAP—specified in the Request For Comment 3748, downloadable at the URL www.ietf.org/rfc/rfc3748.txt at the filing date of the present patent application), an IETF standard that defines a general-purpose authentication protocol, to permit a wide variety of authentication mechanisms (called "EAP-types"). Moreover, the IEEE 802.1X standard includes a procedure, embedded in the authentication method, for dynamic derivation of keys, on a per client and per session basis.

Without any pretension of completeness (being concepts per-se known in the art), the "players" of the IEEE 802.1X standard framework are the "supplicant", the "authenticator" (or network port), and the "authentication server".

The supplicant is an entity, located at one end of a point-to-point LAN link segment that seeks to be authenticated by an authenticator attached to the other end of that link. The supplicant desires to use a service (MAC connectivity) offered via a port on the authenticator. The supplicant authenticates via the authenticator to a central authentication server, which directs the authenticator about how to provide the service after successful authentication. In the exemplary scenario of FIG. 1, the role of the supplicant is played by the wireless terminals, like the wireless terminal 125.

The authenticator is an entity that facilitates the authentication of the entity (the supplicant) attached to the other end of the LAN link segment; in the scenario of FIG. 1, the role of authenticator is played by the generic AP, like the AP 120. The authenticator works in pass-through mode between the wireless terminal and the authentication server, implementing the logical doors control mechanism. The authenticator has two ports of access to the network: an "uncontrolled" port and a "controlled" port. The uncontrolled port is always open to the authentication message transit, whereas the controlled port only opens at the end of the authentication procedure, and only if the procedure has been successful. At the end of authentication procedure, the authenticator receives from the authentication server the coding keys, per client and per session, for the subsequent data radio communications with the supplicant.

The Authentication Server (AS, labeled 140 in FIG. 1), provides authentication services for authenticating the supplicants. The authentication server can for example be a RADIUS (Remote Authentication Dial-In User Service) server, a Kerberos server, a Diameter server etc., and can either be a dedicated appliance (as in the exemplary case depicted in FIG. 1) or it can be integrated ("co-located") in the authenticator (i.e., in the APs 120).

Examples of EAP-types supported by the EAP, and that can be advantageously exploited in the automatic service access credentials provisioning method according to the described embodiment of the invention are:

Extensible Authentication Protocol-Transport Layer Security (EAP-TLS—specified in RFC 2716): it is an IETF protocol based on TLS handshake and uses digital certificates for both supplicant and authentication server authentication; as known in the art, a digital certificate can for example be seen as an electronic counterpart of what in normal life is an "identity card": the digital certificate establishes the user credentials when doing electronic transactions over a PDN; a digital certificate is issued by a certification authority and usually contains data like the user name, a serial number, expiration dates, a copy of the certificate holder's public key (used for encrypting messages and digital signatures), and the digital signature of the certificate-issuing authority, allowing a recipient can verify that the certificate is real.

Protected Extensible Authentication Protocol (EAP-PEAP—downloadable at http://www.ietf.org/internet-drafts/draft-josefsson-pppext-ean-tls-eap-11.txt at the filing date of the present application): it is based on TLS handshake, and uses digital certificates for authentication server authentication and any EAP-type for supplicant authentication;

EAP-Tunneled Transport Layer Security (EAP-TTLS—downloadable, at the filing date of the present application, at the URL http://www.ietf.org/internet-drafts/draft-funk-eap-ttls-v0-00.txt and http://www.ietf.org/internet-drafts/draft-funk-eap-ttls-v1-00.txt): it is an IETF draft protocol based on TLS handshake, using digital certificates for authentication server authentication and any authentication method for the supplicant.

In general, the EAP is built around a "challenge-response" communication paradigm. There are four types of messages that are exchanged for authentication purposes: EAP Request messages, EAP Response messages, EAP Success messages and EAP Failure messages. In particular, an EAP Request message is sent to the supplicant indicating a challenge, and the supplicant replies using an EAP Response message. The other two messages (EAP Success messages and EAP Failure messages) notify the supplicant of the successful/unsuccessful authentication procedure outcome.

In order to access the wireless network 105, a generic wireless terminal, like the wireless terminal 125, playing the role of the supplicant, firstly has to associate with an AP, like the AP 120, which plays the role of authenticator. If for example it is the first time that the wireless terminal tries to access the wireless network (possibly the first time after a disconnection from the network), the wireless terminal has to perform a full authentication procedure, compliant with the IEEE 802. In standard, at the authentication server, through the AP.

For example, the wireless terminal (supplicant) sends to the AP (authenticator) an IEEE 802.11 Probe Request message. The AP replies sending to the wireless terminal an IEEE 802.11 Probe Response message, including security parameters, and creates a physical link with the wireless terminal. Then, the wireless terminal sends to the AP an IEEE 802.11 Open System Authentication Request message, to which the AP replies with an IEEE 802.11 Open System Authentication Response message. The mobile terminal then sends to the AP an IEEE 802.11 Association Request message, and the AP replies sending back an IEEE 802.11 Association Response message, with the indication that the operation has been completed successfully. This procedure allows the wireless user terminal to be associated to the AP. Up to now, the traffic passes through the uncontrolled port of the AP, and the controlled port is still blocked, because the wireless terminal is not yet authenticated.

Figure 2:
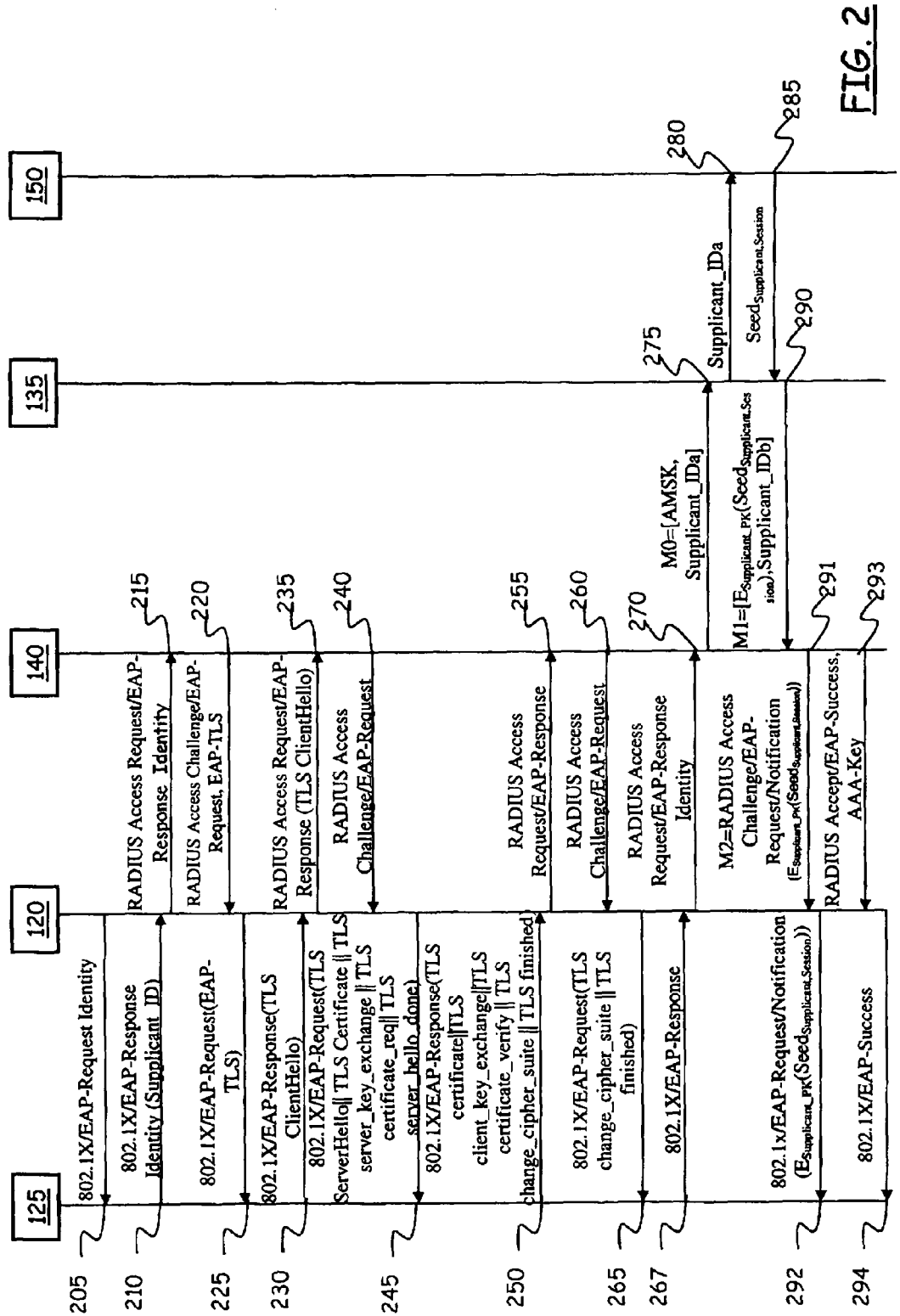
FIG. 2 schematically shows, in terms of signals exchanged by the various players, a service access credentials provisioning method according to a first embodiment of the present invention.

After the successful association, the authentication procedure is performed; in FIG. 2, the messages exchanged during the authentication procedure by the various players, which, in the exemplary scenario of FIG. 1, are the wireless terminal 125, the AP 120 and the authenticator 140, are schematically depicted.

The wireless terminal 125 starts the authentication procedure sending to the AP 120 an IEEE 802.1X EAPOL Start message, and the AP 120 replies sending back to the wireless terminal 125 an IEEE 802.1X EAP Request/Identity message 205, requesting the wireless terminal to provide its identity; in reply to this request, the wireless terminal 125 provides its identity, sending to the AP 120 an IEEE 802.1X EAP Response/Identity message 210, that is forwarded by the AP 120 to the authentication server 140, encapsulated in a message 215 formatted according to the predetermined communication protocol, e.g. the RADIUS protocol (particularly, a RADIUS Access Request message). The authentication server 140 then performs with the wireless user terminal 125, through the AP 120, the authentication procedure, based on the negotiated EAP authentication method (EAP-Type), hereinafter assumed merely by way of example to be the EAP-TLS.

Greatly summarizing (the authentication procedure is per-se known to those skilled in the art, being standardized), in reply to the message 215 received from the AP 120, the authentication server 140 sends to the AP 120 a RADIUS Access Challenge message 220 with embedded an EAP-Request,EAP-TLS message, which is received at the AP 120 and forwarded to the wireless terminal 125 as an IEEE 802.1X/EAP-Request(EAP-TLS) message 225. The wireless terminal 125 replies sending to the AP 120 an IEEE 802.1X/EAP-Response (TLS ClientHello) message 230, which the AP 120 receives and forwards to the authentication server 140 embedded in a RADIUS Access Request/EP-Response (TLS ClientHello) message 235. The TLS; ClientHello message passed from the wireless terminal 125 to the authentication server 140, conveys the version of the TLS protocol by which the client wishes to communicate during the session, a client-generated random value, the session identifier and the combinations (so-called "cipher suite") of cryptographic algorithms supported by the terminal 125, ordered by the client's preference (favourite choice first), are used in order to create a secure channel, between the wireless terminal 125 and the authentication server 140 through with the authentication procedure is performed in a secure way.

The authentication server 140 then sends to the AP 120 a RADIUS Access Challenge/EAP Request message 240, which the AP 120 forwards to the wireless terminal 125 as an IEEE 802.1X/EAP-Request(TLS ServerHello∥TLS Certificate∥TLS server_key_exchange∥TLS certificate_req∥TLS Server_hello_done) message 245. The TLS Server-Hello message part conveys the version of the TLS protocol supported by the authentication server 140, selected from those suggested by the wireless terminal 125 in the TLS ClientHello message part (within message 230). It also conveys a server-generated random value, the session identifier and the cipher suite selected by the authentication server 140 from the list proposed in the TLS ClientHello message part. Within the TLS Certificate message part the authentication server 140 inserts its digital certificate, in order to be authenticate by the wireless terminal 125. The TLS server_key_exchange message part conveys cryptographic information useful to allow the supplicant (client) to communicate the premaster secret: either an RSA public key to encrypt the premaster secret with, or a Diffie-Hellman public key with which the wireless terminal 125 can complete a key exchange (with the result being the premaster secret.) The TLS certificate_req message part is used by the authentication server 140 to request a certificate from the wireless terminal 125 in order to authenticate it. The TLS server_hello_done message part is sent by the authentication server 140 to indicate the end of the information used for the key exchange, so that the wireless terminal 125 can proceed with its phase of the key exchange.

The wireless terminal 125 replies sending to the AP 120 an IEEE 802.1X/EAP-Response(TLS certificate∥TLS client_key_exchange∥TLS certificate_verify∥TLS change_cipher_suite∥TLS finished) message 250, which the AP 120 forwards to the authentication server 140 embedded in a RADIUS Access Request/EAP-Response message 255. The TLS certificate message part conveys the digital certificate of the wireless terminal 125. With TLS client_key_exchange message part, the premaster secret is set, either though direct transmission of the RSA-encrypted secret, or by the transmission of Diffie-Hellman parameters which will allow each side (the authentication server 140 and the wireless terminal 125) to agree upon the same premaster secret. The TLS certificate_verify message part is used to provide explicit verification of the wireless terminal 125 certificate. The change cipher spec message part is sent by the wireless terminal 125 to notify the authentication server 140 that subsequent records will be protected under the newly negotiated CipherSpec and keys. Finally the TLS finished message part is used to verify that the key exchange and authentication processes have been successful. This is the first message protected with the negotiated algorithms, keys, and secrets. The authentication server 140 receiving the finished messages verifies that the contents are correct.

The authentication server 140 replies sending to the AP 120 a RADIUS Access Challenge/EAP-Request message 260, which the AP 120 forwards to the wireless terminal 125 as an IEEE 802.1X/EAP-Request(TLS change_cipher_suite∥TLS finished) message 265. The TLS change_cipher_suite message part is sent to notify the wireless terminal 125 that subsequent records will be protected under the newly negotiated CipherSpec and keys. Finally, the TLS finished message part is the first message the authentication server 140 sends protected with the negotiated algorithms, keys, and secrets. The authentication server 140 receiving the finished messages verifies that the contents are correct.

The wireless terminal 125 then sends to the AP 120 an IEEE 802.1X EAP Response message 267, which the AP 120 forwards to the authentication server 140, embedded in a RADIUS Access Request 270.

In the message exchange shortly listed in the foregoing, the messages from message 230 to message 265 form the TLS handshake.

In case of positive authentication, the authentication server 140 conventionally sends to the AP 120 an EAP Success message, embedded in a RADIUS Accept message 293, which the AP 120 forwards to the wireless user terminal 125 (IEEE 802.1X EAP Success message 294), otherwise the authentication server sends an EAP Failure message (not shown).

As mentioned in the foregoing, during the authentication procedure, the authentication message traffic passes through the uncontrolled port of the AP 120, and the controlled port remains blocked; after a successful authentication, the controlled port of the AP 120 is unblocked, and the data traffic passes therethrough.

During the authentication procedure, the wireless terminal 125 and the authentication server 140 generate, each one at its own side, a pair of shared secrets, namely a Master Session Key (MSK), and an Extended Master Session Key (EMSK). The authentication server 140 sends to the AP (authenticator) 120 only the MSK (message, typically a 64-Byte digital code). The MSK communicated by the authentication server 140 to the authenticator 120 is referred to as the "AAA-Key" (where the triple A stands for Authentication, Authorization and Accounting). In particular, the AAA-Key is communicated to the authenticator 120 in the RADIUS Accept message 293.

The authenticator 120 exploits the received AAA-key, or a part of it, (typically the first 32 Bytes, forming the so-called Pairwise Master Key—PMK) for generating, as a result of a four-way handshake procedure with the wireless terminal 125, the ciphering keys which will be thereafter used for ciphering the communications between the wireless terminal 125 and the AP 120 over the radio link.

During the authentication procedure, the authentication server 140 and the wireless terminal 125 obtain, at their own sides and starting from the EMSK (i.e., the key that is not communicated to the authenticator 120) a further key, referred to as the Application-specific Master Session Key (AMSK). For example, like the MSK, the AMSK may be a 64-Byte digital code.

The steps so far described refer to a full authentication procedure that the wireless terminal 125 has to perform at least the first time it connects to the wireless network 105.

Once the wireless terminal 125 has authenticated, it is granted access to the wireless network 105; in particular, the user can access the PDN 115, e.g. he/she can surf over the Internet and/or access the intranet of the company for which he/she works, for enjoying of the on-line services offered by the application server 135, e.g. on-line banking services, e-business services, e-mail services.

However, as mentioned in the foregoing, under the assumption that the access to the application service 135 is not free, as it often is, the wireless terminal 125 needs to preliminary authenticate to the application server 135; to this purpose, the user of the wireless terminal 125 needs suitable on-line service access credentials, necessary for accessing the service provider and enjoying the on-line service.

According to an embodiment of the present invention, the service access credentials for authenticating at the application server 135 and accessing the on-line services it offers are provisioned to the wireless terminal 125 as part of the authentication process that the wireless terminal 125 performs, acting as a supplicant, for authenticating to and being granted access to the wireless network 105.

In particular, according to an embodiment of the present invention, a method is provided by means of which the service access credentials necessary to the user of the wireless terminal 125 for authenticating at the application server 135 and accessing the on-line services are automatically and securely provisioned to the wireless terminal 125 as a part of the wireless network authentication procedure based on EAP, particularly the EAP-type EAP-TLS.

As depicted in FIG. 2, after the supplicant 125 and the authentication server 140 have mutually authenticated according to the standard procedure, if the authentication server 140 ascertains that the identity provided by the supplicant (in message 270) is correct, the authentication server 140 sends to the application server 135 a message M0 275:

$$M0=[AMSK, Supplicant\_IDa]$$

containing the AMSK negotiated as part of the IEEE 802.1x authentication process, and the supplicant public digital certificate, or just an identifier thereof (denoted as Supplicant_IDa), adapted to allow the application server 135 univocally identify the correct public digital certificate. In particular, the authentication server 140 sends the full public digital certificate only if it is the first time that the wireless terminal 125 attempts the connection to the application server 135: in this case, the application server 135 stores the received public digital certificate for future uses; if it is not the first time that the wireless terminal 125 attempts the connection to the application server 135, and thus the public digital certificate thereof is already stored at the application server, the authentication server 140 may simply send a certificate identifier (Supplicant_IDa), adapted to enable the application server univocally identify the correct public digital certificate (i.e. the hash of the supplicant Digital Certificate).

Optionally, an on-line service identifier, adapted to identify the on-line service (e.g., Web Access to a Web portal, SIP Proxy Registration, etc.) to which the user of the wireless terminal 125 wishes to have access and for which the supplicant 125 requests valid service access credentials can be included in the message M0 275, to explicitly identify the desired service.

Preferably, communications between authentication server 140 and the application server 135 occurs over a secure channel, e.g., using IPSec or a HTTPs.

The application server 135 stores the received AMSK and the public certificate of the supplicant 125, and generates a One Time Password (OTP) for the supplicant 125, valid for the current session and, if specified, for the given on-line service. In particular, the OTP is calculated as a one-way function (e.g., a hash function) of the AMSK and of a random seed, $Seed_{Supplicant,Session}$, choosen by the application server:

$$OTP_{Supplicant,Session} = f(AMSK, Seed_{Supplicant,Session})$$

In FIG. 1 there is schematically shown, by reference numeral 190, a function in the application server 135 that generates the service access credentials to be provisioned to the user of the wireless terminal 125. The random seed 191, generated for example by a random number generator (not shown) is fed to a service access credentials generator module 192, which generates the credentials, in the example the OTP 185, using the random seed 191 and the AMSK, schematized as 175.

It is pointed out that, for the generation of the OTP, the application server 135 may also rely on an external key manager unit, particularly a Public Key Encryption (PKI) unit, shown in phantom in FIG. 1 and denoted as 150; in this case, upon arrival of the message M0 275, the application server 135 sends to the PKI unit 150 the supplicant public digital certificate, or just the identifier thereof, if it is not the first time the wireless user terminal 125 asks the service access credentials (in such a case, the digital certificate is already stored at the PKI unit 150); optionally, also the on-line service identifier is included in the message 280 sent to the PKI unit. The PKI 150 unit generates and sends to the application server 135 the random seed $Seed_{Supplicant,Session}$ valid for that supplicant and for the current session (message 285).

The application server 135 encrypts (encryption module 193 in FIG. 1) the random seed 191 for the supplicant 125 generated for the current session with the public key 170 of the supplicant, stored (public digital certificates database 194) in the public certificate of the supplicant sent by the authentication server 140 (or stored at the application server 135), and sends the encrypted seed to the authentication server 140, through the secure channel; in particular, the encrypted seed is included in a message M1 290 that in addition contains an identifier Supplicant_IDb of the supplicant (e.g., the Distinguished Name—DN—indicated in the supplicant public certificate, or possibly the same identifier Supplicant_IDa included in the message M0):

$$M1=[E_{Supplicant\_PK}(Seed_{Supplicant,Session}), Supplicant\_IDb]$$

Optionally, the identifier of the on-line service, if specified, may also be included in the message M1 290.

Upon receipt of the message M1 290 from the application server 135, the authentication server 140 first verifies that it has a pending request for the supplicant 125 (identified by the supplicant identifier included in the message M1), and, if specified, for the given on-line service; the authentication server 140 then inserts the encrypted seed $E_{Supplicant\_PK}$ ($Seed_{Supplicant,Session}$) in an EAP Request/Notification packet that is sent to the AP 120 encapsulated in a RADIUS Access-Challenge message M2 291:

$M2$=RADIUS Access-Challenge/EAP-Request/Notification[$E_{Supplicant\_PK}$($Seed_{Supplicant,Session}$)]

The AP 120 forwards the received encrypted seed $E_{Supplicant\_PK}$($Seed_{Supplicant,Session}$) to the supplicant 125 through an IEEE 802.1X EAP Request/Notification message 292.

Finally, as prescribed in the IEEE 802.1X standard, the authentication procedure completes with the authentication server 140 sending to the wireless user terminal 125 (through the AP 120) the IEEE 802.1X EAP Success message 294.

The supplicant 125 has a function adapted to get the service access credentials from the message 292. For example, as schematically shown in FIG. 1, a dedicate software or firmware 155 is installed and running on the wireless terminal 125 that is adapted to receive the encrypted seed $E_{Supplicant\_PK}$ ($Seed_{Supplicant,Session}$) (module 160), using the private key 165 of the supplicant, so as to get the $seed_{Supplicant,Session}$; knowing the AMSK (schematized as 175), a service access credentials extractor module 180 at the supplicant 125 computes the OTP for accessing the on-line service using the same function:

$OTP_{Supplicant,Session}$=f(AMSK,$Seed_{Supplicant,Session}$)

The OTP forms the service access credentials 185.

Following the 4-way handshake typical of the IEEE 802.1X authentication procedure, the supplicant 125 accesses the wireless network 105 and, through the AP 120, the wired LAN 110 and the application server 135. Being provisioned to the service as part of the wireless network authentication process, the supplicant 125 can directly access the on-line service(s), using the provided service access credentials, i.e. the OTP.

In particular, the service access credentials are valid only for the current session, possibly for the specified service, and for the specific supplicant 125.

Thus, it can be appreciated that it is the authentication server 140 that requests to the application server 135 the service access credentials as part of the wireless network authentication procedure, but the service access credentials received from the application server are known only to it and to the supplicant 125, not to the authentication server nor to the AP. This provides an excellent degree of security, because it is avoided that the wireless network operator has knowledge of the service access credentials for accessing the application server. At the same time, the supplicant can be automatically provisioned to the on-line service only after being authenticated and authorized to access the wireless network by the authentication server.

The automatic service access credentials provisioning schema described in the foregoing can be for example, and just by way of example, applied to a scenario of a Voice over IP (VoIP) service, in which specific case the wireless user terminal 125 is a Wi-Fi phone, and the application server 140 is a SIP (Session Initiation Protocol) registar.

In this case the Wi-Fi phone 125, in order to access the VoIP service, needs to register to the SIP registar 135. The exchanged messaging is schematized in FIG. 3.

Similarly to the previously described example, as the Wi-Fi phone 125 associates to (an AP 120 of) the wireless network 105, the IEEE 802.1X EAP-TLS authentication procedure starts. The messages 205 to 270 exchanged by the Wi-Fi phone, the AP and the authentication server are the same as those depicted in FIG. 2. The authentication server verifies the identity provided by the supplicant and, if correct, it sends to the SIP registar 135 a message (M0) 375 containing the AMSK negotiated as part of the IEEE 802.1X authentication process, and the supplicant public certificate (if it is the first time the supplicant attempts to connect to the SIP registar) or the supplicant URI (Uniform Resource Identifier, an identifier typically used to identify SIP users), if the SIP registar has already stored supplicant's public certificate, received in a previous session; in particular, in FIG. 3 the latter case is considered, and the supplicant is identified by the URI Wi-Fiphon@example.org and the message 375 is:

$M0$=[Wi-Fiphone@example.org,AMSK]

The SIP registar 135 stores the AMSK and the identifier of the supplicant (or the public certificate thereof), and generates an OTP ($OTP_{Supplicant,Session}$) for the Wi-Fi phone 125 for the current session; in particular, the OTP is generated as a one-way function (e.g., a hash function) of the AMSK and of a random seed, $Seed_{Supplicant,Session}$:

$OTP_{Supplicant,Session}$=f(AMSK,$Seed_{Supplicant,Session}$)

The SIP registar 135 encrypts the seed $OTP_{Supplicant,Session}$ for the supplicant 125 for the current session with the supplicant public key stored in the supplicant public certificate, and sends the encrypted seed $E_{Supplicant\_PK}$($Seed_{Supplicant,Session}$) back to the authentication server 140 through the secure channel, in a message M1 380 containing, in addition to the encrypted seed, the supplicant identifier:

$M1$=[$E_{Supplicant\_PK}$($Seed_{Supplicant,Session}$),Wi-Fiphone@example.org]

Upon receipt of the message 380, the authentication server first verifies that there is a pending request for the supplicant identified by the supplicant identifier included in the message, then it inserts the encrypted seed $E_{Supplicant\_PK}$ ($Seed_{Supplicant,Session}$) in an EAP Request/Notification packet and sends it to the AP 120 encapsulated in a RADIUS Access-Challenge message M2 385:

$M2$=RADIUS Access-Challenge/EAP-Request/Notification[$E_{Supplicant\_PK}$($Seed_{Supplicant,Session}$)]

The AP 120 forwards the received encrypted seed $E_{Supplicant\_PK}$($Seed_{Supplicant,Session}$) to the Wi-Fi phone 125 through a IEEE 802.1X EAP Request/Notification message 390.

Finally, as prescribed in the standard, the authentication procedure completes with the authentication server 140 sending to the wireless user terminal 125 (through the AP 120) the IEEE 802.1X EAP Success message 294.

The Wi-Fi phone 125 decrypts the encrypted seed $Seed_{Supplicant,Session}$ and, knowing the AMSK, computes the OTP for the SIP service, using the same function as the SIP registar 135:

$OTP_{Supplicant,Session}$=f(AMSK,$Seed_{Supplicant,Session}$)

Following the 4-way handshake, the Wi-Fi phone 125 can access the wireless network 105, and, through the AP 120, the PDN 115 and the SIP registar 135.

Figure 3:
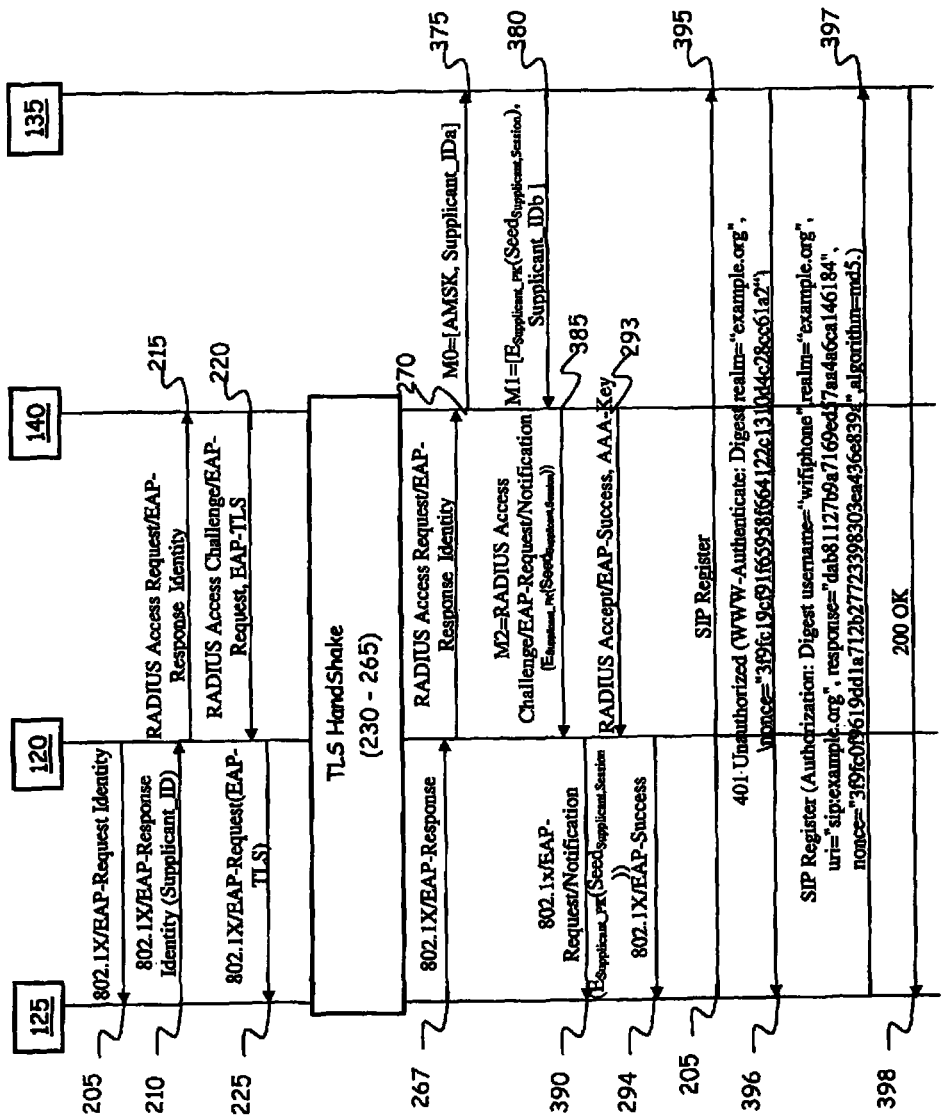
FIG. 3 schematically shows, in terms of signals exchanged by the various players, a service access credentials provisioning method according to a second embodiment of the present invention.

In the example depicted in FIG. 3, the case of a SIP Digest Authentication is used, according to RFC3261 ("SIP: Session Initiation Protocol"). The Wi-Fi phone 125 sends the SIP registar 125 a SIP Register message 395. Upon receipt of the message, the SIP registar 135 generates a negative response (SIP/2.0 401 Unauthorized message 396) and includes the digest challenge into the response message 396.

When the Wi-Fi phone 125 receives the SIP registar response message 396 containing the digest challenge, it calculates the proper digest response as function of the digest challenge and of the OTP OTPSupplicant,Session obtained as part of the network authentication, and sends the SIP register 135 a message 397 including the calculated digest credentials. The SIP registar 135 verifies the digest response and processes the request; if the verification is successful, the SIP registar 135 sends a 200 OK message 398 to the Wi-Fi phone 125 which can then access the VoIP service.

Figure 4:
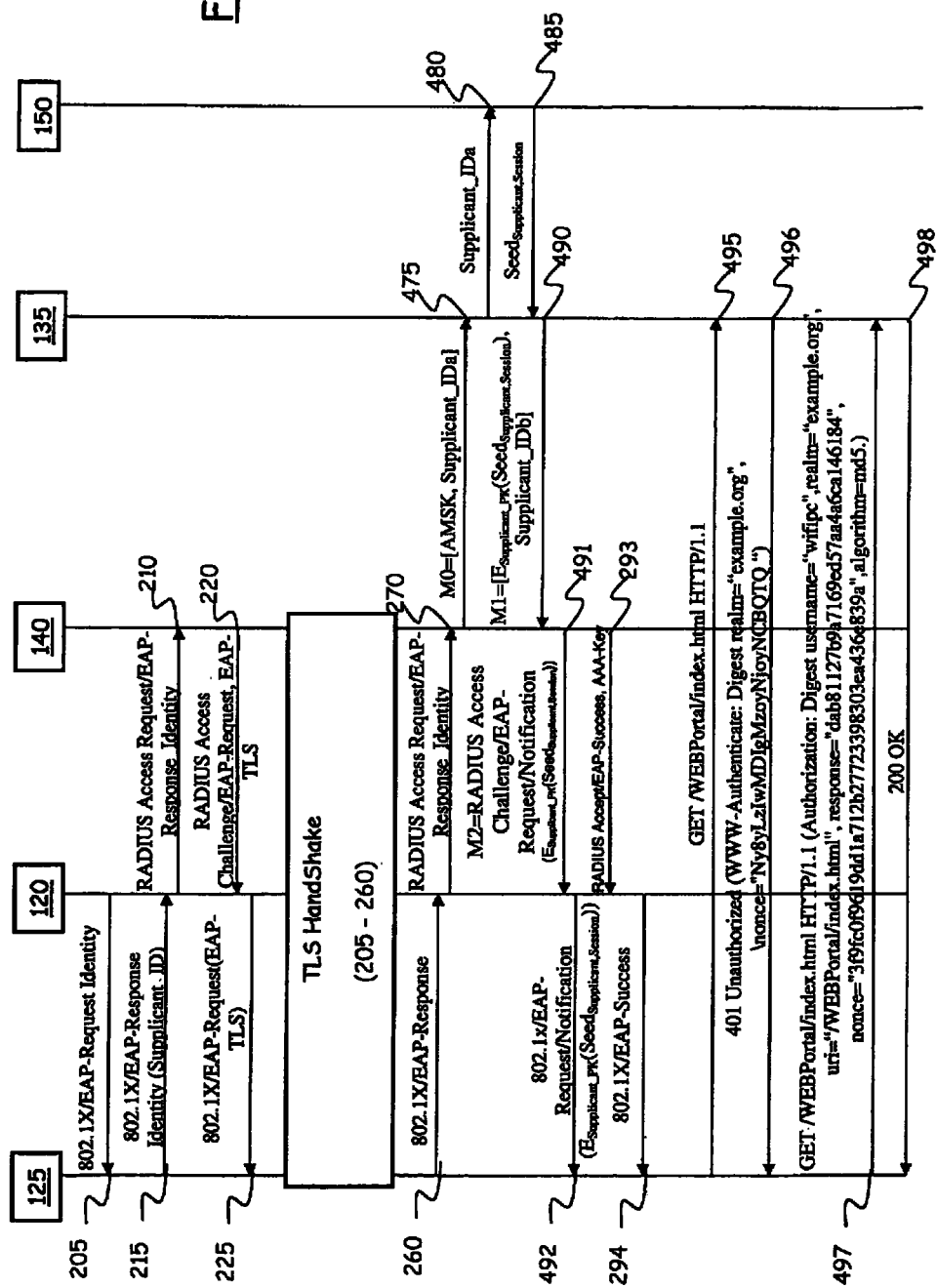
FIG. 4 schematically shows, in terms of signals exchanged by the various players, a service access credentials provisioning method according to a third embodiment of the present invention.

Another exemplary application of the automatic service access credentials provisioning schema described in the foregoing can be the access by a laptop 125 with a Wi-Fi interface of a Web portal 135, through the wireless network 105. The messages exchanged are schematized in FIG. 4.

As the Wi-Fi laptop 125 associates to (an AP 120 of) the wireless network 105 network, the IEEE 802.1X EAP-TLS authentication starts as described in the foregoing. The messages are the same as in the previous two cases The authentication server 140 verifies the identity provided by the supplicant 125 and, if correct, it sends to the Web portal 135 a message (M0) 475 containing the AMSK negotiated as part of the IEEE 802.1X authentication process, and the supplicant public certificate (if it is the first attempt of the supplicant to connect to the Web portal 135) or the supplicant identifier, such as the username (if the Web portal has already stored the supplicant public certificate received in a previous session); in the example of FIG. 4, the latter case is considered and the supplicant is identified by an identifier Wi-Fipc@example.org:

$$M0 = [\text{Wi-Fipc@example.org}, \text{AMSK}]$$

The Web portal 135 stores the supplicant identifier and the AMSK, then it may require (message 480) to the local domain key manager PKI 150 the generation of a random seed $\text{Seed}_{Supplicant,Session}$ for the given supplicant identifier for the current session; once the seed SeedSupplicant,Session is received (message 485), the Web portal 135 computes an OTP for the Wi-Fi laptop 125 for the current session as a one-way function (e.g., a hash function) of the AMSK and of the random seed, $\text{Seed}_{Supplicant,Session}$:

$$\text{OTP}_{Supplicant,Session} = f(\text{AMSK}, \text{Seed}_{Supplicant,Session})$$

The Web portal 135 encrypts the OTP $\text{OTP}_{Supplicant,Session}$ for the Supplicant 125 for the current session with the supplicant public key stored in the supplicant public certificate, and sends the encrypted OTP $E_{Supplicant\_PK}(\text{Seed}_{Supplicant,Session})$ back to the authentication server 140 through the secure channel (message M1 490). The message M1 contains the encrypted ESupplicant_PK(SeedSupplicant, Session) and the supplicant identifier:

$$M1 = [E_{Supplicant\_PK}(\text{Seed}_{Supplicant,Session}), \text{Wi-Fipc@example.org}]$$

The authentication server 140 first verifies that it has a pending request for the given supplicant identifier, then it inserts the encrypted OTP ESupplicant_PK(SeedSupplicant, Session) in an EAP-Request/Notification packet and sends it to the AP 120 encapsulated in a RADIUS Access-Challenge message M2 491.

$$M2 = \text{RADIUS Access-Challenge EAP-Request/Notification}[E\text{Supplicant\_PK}(\text{SeedSupplicant,Session})]$$

Then, the AP 120 forwards the encrypted OTP ESupplicant_PK(SeedSupplicant,Session) to the to the Wi-Fi laptop 125 through a EAP-Request/Notification message 492.

Finally, as prescribed in the standard, the authentication procedure completes with the authentication server 140 sending to the wireless user terminal 125 (through the AP 120) the IEEE 802.1X EAP Success message 294.

The Wi-Fi laptop 125 decrypts the encrypted seed Seed-Supplicant,Session and, knowing the AMSK, computes the OTP for the access to the Web portal, using the same function as the Web portal 135:

$$\text{OTPSupplicant,Session} = f(\text{AMSK}, \text{SeedSupplicant}, \text{Session})$$

Following the 4-way handshake, the Wi-Fi laptop 125 can access the wireless network 105 and, through the AP 120, the PDN 115 and the WEB portal 135. Being provisioned to the service as part of the wireless network authentication process, the supplicant 125 can directly access the services using the provided service access credentials. In the example, the case of an HTTP Digest Authentication is used, according to the RFC2617 ("HTTP Authentication: Basic and Digest Access Authentication"). The Wi-Fi laptop 125 sends to the WEB portal 135 a HTTP GET message 495. The Web portal generates a negative response (HTTP 401 Unauthorized message 496) and includes the digest challenge into the response 496.

When the Wi-Fi laptop 125 receives the response message 496 (containing digest challenge), it calculates the proper digest response as function of the digest challenge and the OTP OTPSupplicant,Session obtained as part of the network authentication, and sends the Web portal 125 a message 497 including the calculated digest credentials. The Web portal 125 verifies the digest response and processes the request; if the verification is successful it sends a 200 OK message 498 to the Wi-Fi laptop 125 which can then access the Web services.

Thanks to the method according to the present invention, described in the foregoing making reference to three possible practical implementations, the end-user has no longer the need to manage different log-ins for different applications with the related security problems previously described, as those credentials are automatically generated on the terminal simplifying end-user experience.

The service access credentials for authenticating to the on-line service provider, derived as part of the wireless network authentication process, are not known to the wireless network operator, and this guarantees the on-line service provider from attacks operated by or through the wireless network operator.

The service access credentials may in particular be derived not only on a per-user basis, but also on a per-session basis (i.e., they are valid only within that session, and expire when the user wireless terminal disconnects from the wireless network); this guarantees the user and the service provider an OTP mechanism far more secure than a "static" solution.

The method of the invention can assure the on-line service provider the possibility to enforce, at the application level, a selective access policy, allowing access to its services only to users connected to preestablished wireless network operators.

The present invention can be implemented rather easily, for example by means of suitable software updates to the software of the authentication server, of the service provider, of the wireless terminal. However, implementation in software is not to be intended as a limitation to the present invention, which can be as well implemented totally in hardware, or as a mix of software and hardware.

Although the present invention has been disclosed and described by way of some embodiments, it is apparent to those skilled in the art that several modifications to the described embodiments, as well as other embodiments of the present invention are possible without departing from the scope thereof as defined in the appended claims.

For example, although in the examples described in the foregoing the EAP-type EAP-TLS has been assumed to be used for the authentication of the supplicant 125, other EAP methods, like for example the EAP-TTLS and the PEAP may be used; in both these alternative EAP methods, like in the EAP-TLS, a digital certificate is used for the supplicant authentication. More generally, supplicant authentication methods not implying the use of digital certificates may be exploited, for example methods based on an asymmetric (public key, private key) encryption mechanism, provided that the service provider, i.e. the application server is capable to establish univocally and unambiguously that a given public key belongs to a certain user; for example, the application server may keep a list of allowed public keys, each one associated to an authorized user. However, the use of digital certificates has the advantage that the certificates themselves are guaranteed by a certification authority.

Also, although in the foregoing it has been assumed that the service access credentials, i.e. the password generated by the application server is a one-time password, freshly generated each time the generic user accesses the wireless network (i.e., a session-based password), this is merely to be intended as an advantageous but not limitative embodiment, since the password may not change from session to session.

It is again pointed out that although described making reference by way of example to the case of a wireless access network, particularly an IEEE 802.11 WLAN, the invention also applies to different scenarios. For example, the present invention can be applied to a wired access network (e.g., an IEEE 802.3 LAN, also known as Ethernet), where IEEE 802.1x standard and EAP are used for network node's authentication. More generally, the present invention could be extended to contexts where the network node's authentication mechanism is based on EAP like, for example, IEEE 802.16 (also known as Wi-Max) networks, and, in general, to access networks using the IETF PANA (Protocol for carrying Authentication for Network Access) protocol (downloadable from the web site http://www.ietf.org/html.charters/pana-charter.html at the filing date of the present application); PANA is, in fact, a protocol that allows mobile communication terminals to authenticate to the access network using IP protocols, independently of link-layer specific mechanisms, based on EAP types.

The invention claimed is:

1. A method for automatically provisioning a communications terminal with service access credentials for accessing an on-line service offered by an on-line service provider accessible through a communications network, wherein the communications network comprises at least one authentication entity for authenticating the communications terminal in order to conditionally grant access to the communications network, wherein said authenticating is based on public key cryptography, the method comprising:

determining, at the on-line service provider, a security level of the communications network based on an identification of the communications network;

enabling, at the on-line service provider, one or more security functions based in part on the determined security level, wherein the access credentials for accessing the on-line service are associated with the security functions;

authenticating a network access requestor, in part, by having the authentication entity request the on-line service provider generate said service access credentials based on the enabled security functions, wherein the network access requestor comprises a communications terminal;

generating, at the on-line service provider, the service access credentials, wherein the service access credentials expire when the communications terminal disconnects from the communication network;

encrypting, at the on-line service provider, the service access credentials by exploiting a public encryption key of the network access requestor, such that the authentication entity is not able to decrypt the encrypted service access credentials;

providing, by the on-line service provider, the encrypted service access credentials to the authentication entity; and causing, by the authentication entity, the network access requestor to be provided with the encrypted service access credentials.

2. The method according to claim 1, wherein having the authentication entity request to the on-line service provider the generation of said service access credentials comprises having the authentication entity provide to the on-line service provider an authentication Key negotiated by the authentication entity and the network access requestor during said authenticating, and at least one among the public encryption key of the network access requestor or an identifier of the network access requestor, said identifier being adapted to enable the on-line service provider to determine the public encryption key of the network access requestor.

3. The method according to claim 2, wherein the on-line service provider manages a list of allowed public encryption keys, and is adapted to determine whether a received public encryption key is in the allowed list.

4. The method according to claim 1, wherein said authenticating is based on public digital certificates.

5. The method according to claim 4, wherein said having the authentication entity request to the on-line service provider the generation of said service access credentials, comprises having the authentication entity provide to the on-line service provider an authentication key negotiated by the authentication entity and the network access requestor during said authenticating, and at least one among a public digital certificate of the network access requestor or a identifier of the network access requestor, said identifier being adapted to enable the on-line service provider to determine the public digital certificate of the network Access requestor.

6. The method according to claim 5, wherein the authentication entity provides the public digital certificate to the on-line service provider only once, and the on-line service provider is adapted to store the received public digital certificate.

7. The method according to claim 2, wherein said encrypting the service access credentials comprises encrypting a password using a public encryption key of the network access requestor, said public encryption key being specified in a public digital certificate.

8. The method according to claim 1, wherein said having the authentication entity request to the on-line service provider the generation of said service access credentials comprises having the authentication entity provide to the on-line service provider an identifier of an on-line service to which the network access requestor wants to have access.

9. The method according to claim 2, wherein generating the service access credentials comprises generating a password based on said authentication key and a random value.

10. The method according to claim 9, wherein said password is generated as a one-way function of said authentication key and said random value.

11. The method according to claim 9, wherein said password is generated by a public key infrastructure upon request by the on-line service provider.

12. The method according to claim 9, wherein said providing the encrypted service access credentials to the authentication entity comprises providing to the authentication entity an encrypted random value.

13. The method according to claim 12, wherein said providing the encrypted service access credentials to the authentication entity comprises providing to the authentication entity, together with an encrypted password, an identifier of the network access requestor.

14. The method according to claim 12, wherein having the authentication entity cause the network access requestor to be provided with the encrypted service access credentials comprises causing the network access requestor to be provided with the encrypted random value.

15. The method according to claim 14, further comprising:
having the network access requestor decrypt the received encrypted random value using a private decry key of the network access requestor.

16. The method according to claim 15, further comprising:
having the network access requestor determine the service access credentials for accessing the on-line service by applying a one-way function to the decrypted random value, using the authentication key.

17. The method according to claim 1, wherein the on-line service comprises a voice over IP service.

18. The method according claim 1, wherein the on-line service comprises an access to a web portal.

19. A system for automatically provisioning a communications terminal configured for a communications network, service access credentials for accessing an online service offered by an on-fine service provider accessible through the communications network comprising:
at least one authentication entity configured to authenticate a network access requestor in order to conditionally grant thereto access to the communications network, wherein the authentication is based on public key cryptography; and
at least one on-line service provider accessible through the communications network and providing an on-line service, wherein:
the authentication entity is configured to request to the on-line service provider the generation of said service access credentials for accessing during the authentication of the network access requestor;
the on-line service provider is configured to:
determine a security level of the communications network based on an identification of the communications network;
enable one or more security functions based in part on the determined security level, wherein the access credentials for accessing the on-line service are associated with the security functions;
generate the service access credentials, based oil the one or more enabled security functions, such that the authentication entity is not able to decrypt the encrypted service access credentials and the service access credentials expire when the communications terminal disconnects from the communication network,
encrypt the service access credentials by exploiting a pubic encryption key of the network access requestor, and
provide the encrypted service access credentials to the authentication entity; and
the authentication entity is configured to cause the network access requestor to be provided with the service access credentials as a part of the authentication of the network access requestor.

20. The system according to claim 19, wherein the communications network further comprises at least one access point adapted to enable the network access requestor to connect to the communications network.

21. The system according to claim 19, wherein said communications network comprises a wireless network and said network access requestor comprises a wireless communications terminal.

22. The system according to claim 21, wherein the wireless network comprises an IEEE 802.11 wireless network.

23. An on-line service provider accessible through a communications network and providing an on-line service, the on-line service provider being configured to:
receive a request for service access credentials by an authentication entity configured to authenticate a network access requestor in order to conditionally grant thereto access to the communications network, based on public key cryptography;
determine a security level of the communications network based on an identification of the communications network;
enable one or more security functions based in part on the determined security level, wherein the access credentials for accessing the on-line service are associated with the security functions;
generate the service access credentials, based on the one or more enabled security functions, wherein the service access credentials expire when the communications terminal disconnects from the communication network;
encrypt the service access credentials by exploiting a public encryption key of the network access requestor, such that the authentication entity is not able to decrypt the encrypted service access credentials; and
provide the encrypted service access credentials to the authentication entity.

24. A communications terminal configured for a communication network, the communications terminal configured to:
interact with an authentication entity during an authentication procedure for being granted access to the communications network, based on public key cryptography;
during an authentication procedure with the authentication entity, receive from the authentication entity encrypted service access credentials for accessing an on-line service offered by an on-line service provider accessible through the network, said encrypted service access credentials being determined by the on-lines service provider based on a known security level of the communications network, wherein the service access credentials are encrypted with a public encryption key of the communications terminal, wherein the encryption was performed by an on-line service provider such the authentication entity is not able to decrypt the encrypted service access credentials, and said encrypted service access credentials expire when the communications terminal disconnect from the communication network; and
decrypt the received encrypted service access credentials using a private decryption key.

* * * * *